(12) United States Patent
Kubota

(10) Patent No.: US 10,503,108 B2
(45) Date of Patent: Dec. 10, 2019

(54) POWER SUPPLY APPARATUS FOR OUTPUTTING FIRST AND SECOND VOLTAGES FROM ONE TRANSFORMER AND IMAGE FORMING APPARATUS INCLUDING POWER SUPPLY APPARATUS

(71) Applicant: CANON KABUSHIKI KAISHA, Tokyo (JP)

(72) Inventor: Junichi Kubota, Higashiyamato (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/052,434

(22) Filed: Aug. 1, 2018

(65) Prior Publication Data

US 2019/0049883 A1 Feb. 14, 2019

(30) Foreign Application Priority Data

Aug. 9, 2017 (JP) .................................. 2017-154665

(51) Int. Cl.
*H02M 3/335* (2006.01)
*G03G 15/00* (2006.01)
*G03G 15/02* (2006.01)
*G03G 15/16* (2006.01)

(52) U.S. Cl.
CPC ..... *G03G 15/5004* (2013.01); *G03G 15/0283* (2013.01); *G03G 15/168* (2013.01); *G03G 15/1675* (2013.01); *G03G 15/80* (2013.01); *H02M 3/335* (2013.01)

(58) Field of Classification Search
None
See application file for complete search history.

(56) References Cited

U.S. PATENT DOCUMENTS

| | | | | | |
|---|---|---|---|---|---|
| 4,611,152 | A | * | 9/1986 | Hishiki | .................. H02M 3/335 315/411 |
| 5,689,409 | A | * | 11/1997 | Scharlach | ............... H02M 1/34 363/20 |
| 5,856,916 | A | * | 1/1999 | Bonnet | .................. H02M 3/335 363/20 |

(Continued)

FOREIGN PATENT DOCUMENTS

| JP | 2007-206414 A | | 8/2007 |
|---|---|---|---|
| JP | 2007206414 A | * | 8/2007 |

*Primary Examiner* — Jeffrey A Gblende
(74) *Attorney, Agent, or Firm* — Canon USA, Inc., IP Division

(57) ABSTRACT

A power supply apparatus including a transformer, a first rectifier smoothing unit, a separation unit, a second rectifier smoothing unit, a resistor, and a rectifier unit. The first rectifier smoothing unit is configured to rectify and smooth an alternating-current voltage generated in a secondary coil of the transformer. The separation unit configured to use the alternating-current voltage generated in the secondary coil of the transformer as an input and generate an alternating-current voltage, from which alternating-current components are separated, as an output. The second rectifier smoothing unit is configured to rectify and smooth the output of the separation unit. The resistor is connected to a line branched from a line that connects the separation unit to the second rectifier smoothing unit. The rectifier unit is connected in series between the resistor and a reference potential.

17 Claims, 8 Drawing Sheets

(56) References Cited

U.S. PATENT DOCUMENTS

| | | | |
|---|---|---|---|
| 9,960,684 B2* | 5/2018 | Luccato | H02M 3/335 |
| 2004/0184290 A1* | 9/2004 | Elgert | H02M 1/34 |
| | | | 363/16 |
| 2012/0127762 A1* | 5/2012 | Reddy | H02M 3/33592 |
| | | | 363/21.04 |

* cited by examiner

POWER SUPPLY APPARATUS FOR OUTPUTTING FIRST AND SECOND VOLTAGES FROM ONE TRANSFORMER AND IMAGE FORMING APPARATUS INCLUDING POWER SUPPLY APPARATUS

BACKGROUND OF THE INVENTION

Field of the Invention

One disclosed aspect of the embodiments relates to a power supply apparatus and an image forming apparatus.

Description of the Related Art

Up to now, a power supply apparatus provided with a transformer, a driving circuit that drives the transformer, and a rectifier circuit and configured to generate a direct-current high voltage by rectifying and smoothing a voltage boosted by the transformer has been proposed as a power supply apparatus for an image forming apparatus that adopts an electrophotographic method.

In the image forming apparatus based on the electrophotographic method, first, an optical image corresponding to an image that is desired to be copied is projected onto an image bearing body charged to have the same polarity as a charging polarity of toner via a charging member such as a charging roller, and an electrostatic latent image pattern is obtained. Next, charged toner is supplied, and the latent image pattern is caused to absorb this toner to be developed. A recording sheet is overlapped with the developed toner to be applied with a polarity opposite to the charging polarity of the toner by a transfer member, and charges are uniformly applied to a back surface of a transferred medium such as paper, so that a toner image formed on the image bearing body is electrostatically transferred onto the transferred medium. Thereafter, a fixing device applies heat and pressure to the transfer paper to fix a transferred developing agent image, and image formation onto the recording sheet is ended.

In the above-described transfer process, the charges need to be appropriately applied to the back surface of the transferred medium. However, a resistance value of a transfer roller functioning as the transfer member which uses a general ionic conductive material largely changes depending on a moisture content contained in the air, and the transfer roller has a feature of being easily affected by an environment (temperature, moisture). For this reason, to appropriately supply the charges to load having a changing resistance value, a high voltage power supply apparatus that applies bias to the transfer roller generally adopts a constant current control method.

When the toner is adhered onto the above-described transfer roller surface, a cleaning operation for moving the toner adhered onto the surface to the image bearing body is performed by applying a voltage having the same polarity as the charging polarity of the toner. At this time, a voltage used for the cleaning operation needs to be higher than a charging voltage of the image bearing body (the voltage needs to be lower in the case of a negative polarity).

To realize the above-described electrophotographic process, an image forming apparatus in related art is provided with a transformer configured to generate necessary bias for each of biases such as a charging voltage, a development voltage, and a transfer voltage. However, in recent years, miniaturization and cost reduction in the image forming apparatus have been demanded by the market, and an attempt to generate a plurality of biases by a common transformer has been proposed as described in Japanese Patent Laid-Open No. 2007-206414.

In a case where the plurality of biases are output by the common transformer in the power supply apparatus as described above, advantages are attained that the number of the transformers can be decreased, and the apparatus can be miniaturized. On the other hand, an approach for miniaturizing the transformer itself is also important. Here, in a case where the miniaturization of the transformer is considered, for example, a method of reducing a transformer output is exemplified. However, even when bias outputs such as charging, development, and transfer in image formation are to be reduced, the bias outputs are not easily changed in view of maintenance of an image quality.

SUMMARY OF THE INVENTION

A power supply apparatus according to an aspect of the embodiments includes a transformer, a first rectifier smoothing unit, a separation unit, a second rectifier smoothing unit, a resistor, and a rectifier unit. The first rectifier smoothing unit is configured to rectify and smooth an alternating-current voltage generated in a secondary coil of the transformer. The separation unit is configured to use the alternating-current voltage generated in the secondary coil of the transformer as an input and generate an alternating-current voltage, from which alternating-current components are separated, as an output. The second rectifier smoothing unit is configured to rectify and smooth the output of the separation unit. The resistor is connected to a line branched from a line that connects the separation unit to the second rectifier smoothing unit. The rectifier unit is connected in series between the resistor and a reference potential.

Further features of the disclosure will become apparent from the following description of exemplary embodiments with reference to the attached drawings.

DESCRIPTION OF THE EMBODIMENTS

Hereinafter, modes for carrying out the disclosure will be described in detail by way of exemplary embodiments.

First Exemplary Embodiment

Figure 1:
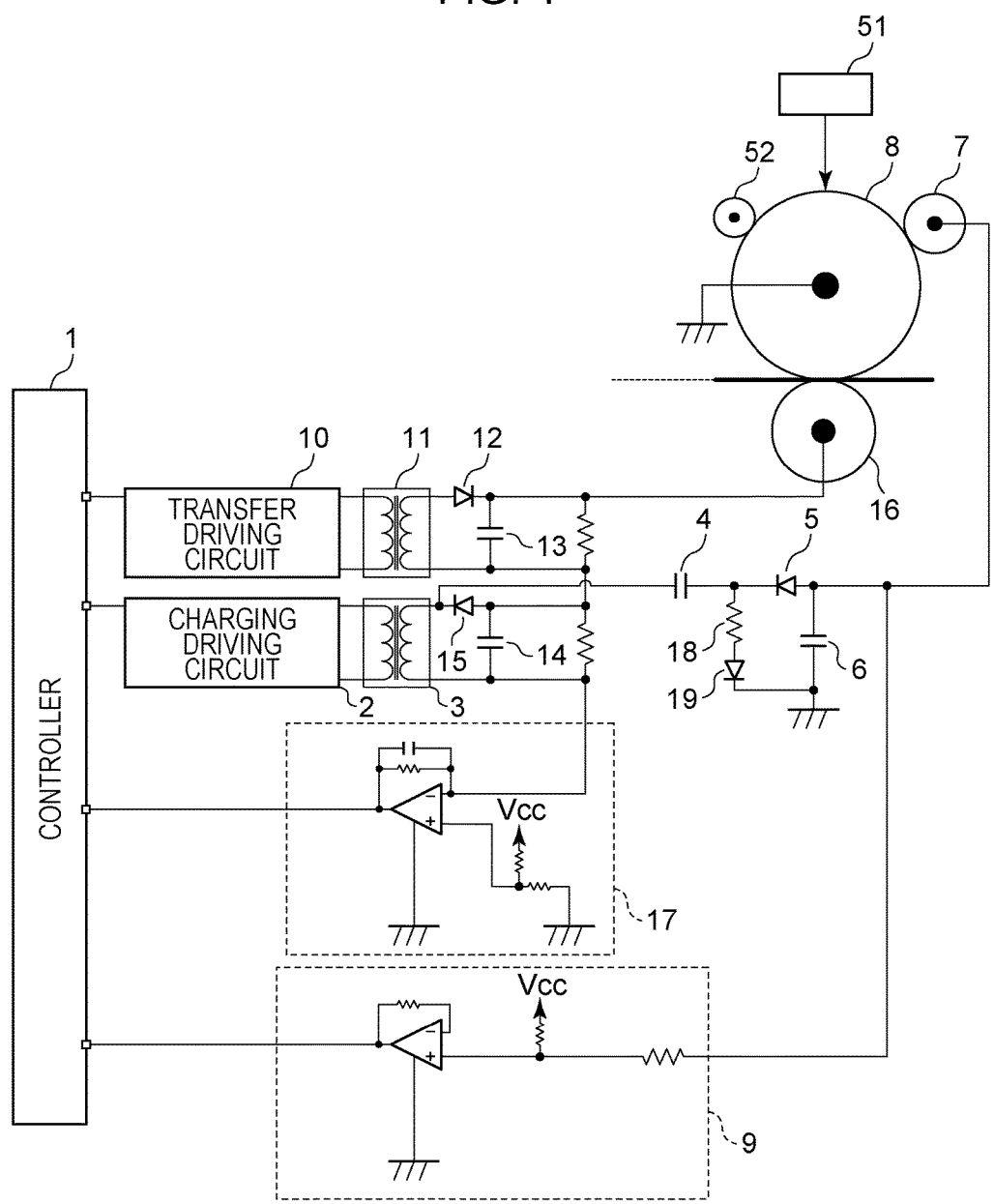
FIG. 1 illustrates a configuration of a power supply apparatus according to a first exemplary embodiment.

FIG. 1 illustrates a configuration of a power supply apparatus according to the present exemplary embodiment. Hereinafter, respective processes including charging, exposure, development, transfer, and cleaning of a transfer roller in an image forming process based on an electrophotographic method using toner charged to have a negative polarity will be described with reference to FIG. 1.

First, in the charging process, a controller 1 puts a charging driving circuit 2 into an on state and generates a high alternating-current voltage on a secondary side of a transformer 3. Although a detail is not illustrated in the drawing, the controller 1 is provided with a central processing unit configured to execute control programs for various control processes, input and output interfaces for inputting and outputting a signal, a volatile memory that stores the control programs, a hard disc drive, and the like as components. After alternating-current components of the high voltage generated on the secondary side of the transformer 3 are separated by a capacitor 4 (coupling capacitor), in other words, after direct-current components are removed, the high voltage is rectified by a diode 5 to charge a capacitor 6 by a negative voltage. The capacitor 6 and the diode 5 constitute a rectifier smoothing circuit serving as a second rectifier smoothing unit. It should be noted that a rectifier smoothing circuit serving as a first rectifier smoothing unit will be described below.

A resistor 18 is connected to a line branched from a line that connects the capacitor 4 serving as a separation unit and the diode 5 serving as the second rectifier smoothing unit to each other and plays a role for suppressing the charging to the capacitor 4. In a case where the resistor 18 is not arranged, when a positive voltage is generated at an output terminal of the transformer 3, a current path (FIG. 2A) flowing into a ground (reference potential) is not formed, and only a current path as illustrated in FIG. 2B exists, so that the charging of the capacitor 4 is immediately performed. The resistor 18 has a function for suppressing the above-described immediate charging of the capacitor 4. A diode 19 connected in series to the resistor 18 interrupts the current path in a case where a negative voltage is generated. The voltage of the capacitor 6 after the charging is applied to a charging roller 7 as a charging bias to uniformly charge a photosensitive drum 8.

The charging bias is detected by a voltage detection circuit 9 and fed back to the controller 1. The controller 1 controls a state of the charging driving circuit 2 to set the charging bias to be constant and performs constant voltage control. It should be noted that the voltage detection circuit 9 may be removed depending on an image quality set as a target. With this configuration, a merit of the miniaturization of the power supply apparatus can also be attained.

Next, laser emission is performed by an exposure device 51 on the basis of image data input to the apparatus in the exposure process, and an electrostatic latent image is formed on the charged image bearing body surface. It should be noted that the exposure device 51 may adopt not only a light emission method of a laser method using semiconductor laser but also a light-emitting diode (LED) light emission method using an LED. The development process is then performed by a development device 52, toner having a negative polarity is adhered onto a part of the formed electrostatic latent image to perform the development, and a toner image in accordance with the image data is formed on the image bearing body surface. It should be noted that, in the following descriptions of the configuration of the power supply apparatus, the exposure device and the development device are not illustrated in the drawing, but in actuality, each power supply apparatus supplies the voltage to the exposure device and the development device similarly as in FIG. 1.

Next, in the transfer process, the controller 1 puts a transfer driving circuit 10 into an on state to generate a high voltage on a secondary side of a transformer 11. The high voltage generated on the secondary side of the transformer 11 is rectified by a diode 12 to charge a capacitor 13 by a positive voltage. At this time, since the charging driving circuit is still in the on state, a capacitor 14 is charged with a negative voltage obtained by rectifying the high voltage generated at a secondary coil of the transformer 3 by a diode 15. The capacitor 14 and the diode 15 constitute the first rectifier smoothing unit. The positive voltage charged in the capacitor 13 and the negative voltage charged in the capacitor 14 are superimposed on each other to be applied to a transfer roller 16 as a transfer bias. For example, in a case where a negative high voltage of −900 V is generated in the capacitor 14 and a positive high voltage of +2900 V is generated in the capacitor 13, a high voltage of +2000 V is applied to the transfer roller 16. The toner image formed on the image bearing body surface is transferred onto a sheet serving as a transferred medium passing between the transfer roller 16 and the photosensitive drum 8 by the applied transfer bias.

A current flowing through the transfer roller 16 is detected by a current detection circuit 17 to be input to the controller 1. The controller 1 controls the state of the transfer driving circuit 10 to set the current flowing through the transfer roller to be constant on the basis of the detection result and performs the constant current control. At this time, since the charging bias is interrupted in terms of the direct current from the transfer bias by the capacitor 4 serving as the separation unit, it is possible to highly accurately detect the current flowing through the transfer roller even when the transfer bias is output while the charging bias is output.

In a cleaning sequence process of the transfer roller, the controller 1 turns off the transfer driving circuit while the charging driving circuit is kept in the on state. At this time, since the negative voltage charged in the capacitor 14 is applied to the transfer roller 16, the toner having the negative polarity which is adhered onto the transfer roller 16 can be moved to the photosensitive drum 8.

Figure 6:
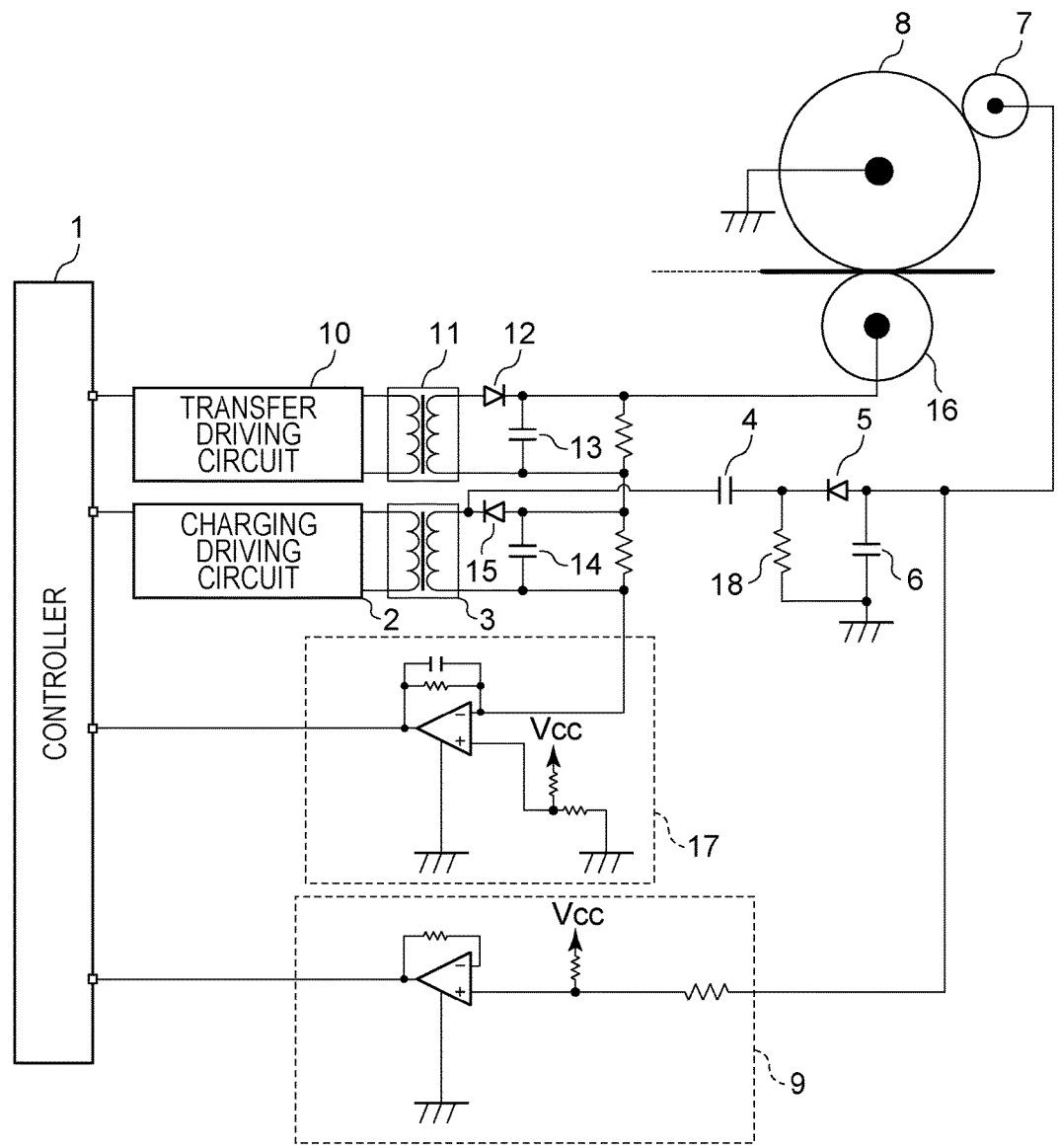
FIG. 6 illustrates a configuration of a power supply apparatus set as a comparison target.

When the above-described operation is performed, since the power supply apparatus having the configuration illustrated in FIG. 6 can generate the charging bias and the cleaning bias for the transfer roller by the common transformer 3, it is advantageous for the miniaturization and the cost reduction. On the other hand, an approach for the miniaturization of the transformer itself will be described below.

FIG. 6 illustrates another configuration of the power supply apparatus for describing a comparison with the power supply apparatus of FIG. 1. In the power supply apparatus of FIG. 6, the diode 19 is removed as compared with the case of FIG. 1. The power supply apparatus of FIG. 1 has a feature of suppressing/adjusting the charging to the capacitor 4, and this feature will be described below with reference to FIG. 1 and FIG. 6.

Case of the Power Supply Apparatus Illustrated in FIG. 6

In the power supply apparatus illustrated in FIG. 6, the capacitor 4 is charged to have the negative voltage. Hereinafter, its charging mechanism and an issue caused by the charging will be described with reference to FIGS. 7A and 7B.

Figure 7A:
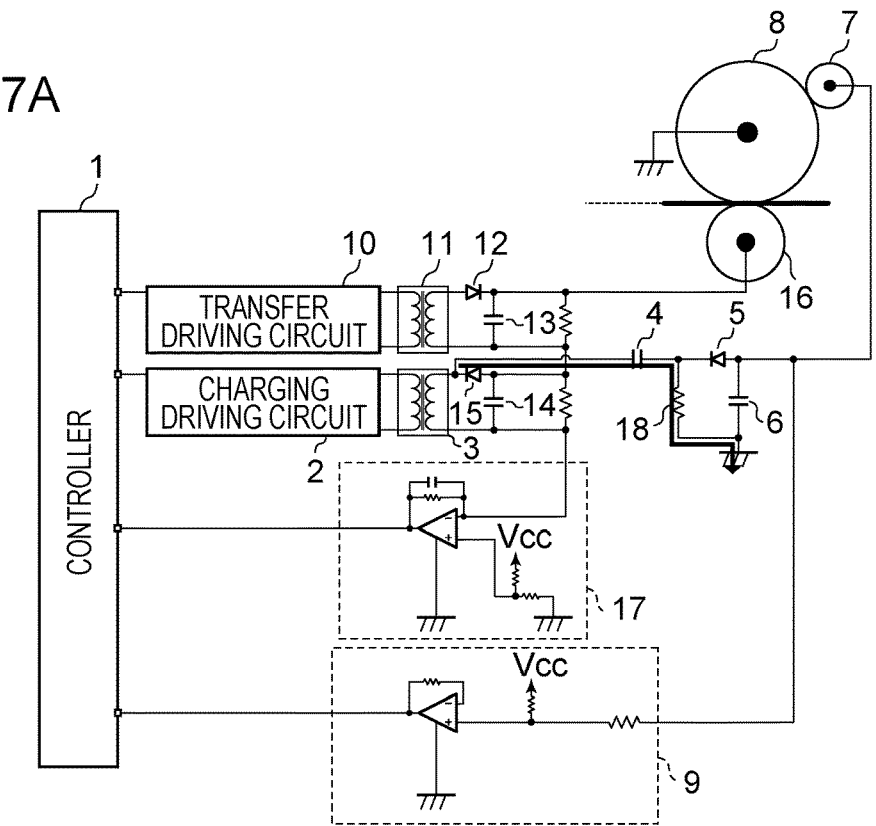
FIGS. 7A and 7B illustrate a current path flowing through a capacitor in the power supply apparatus set as the comparison target.
Figure 7B:
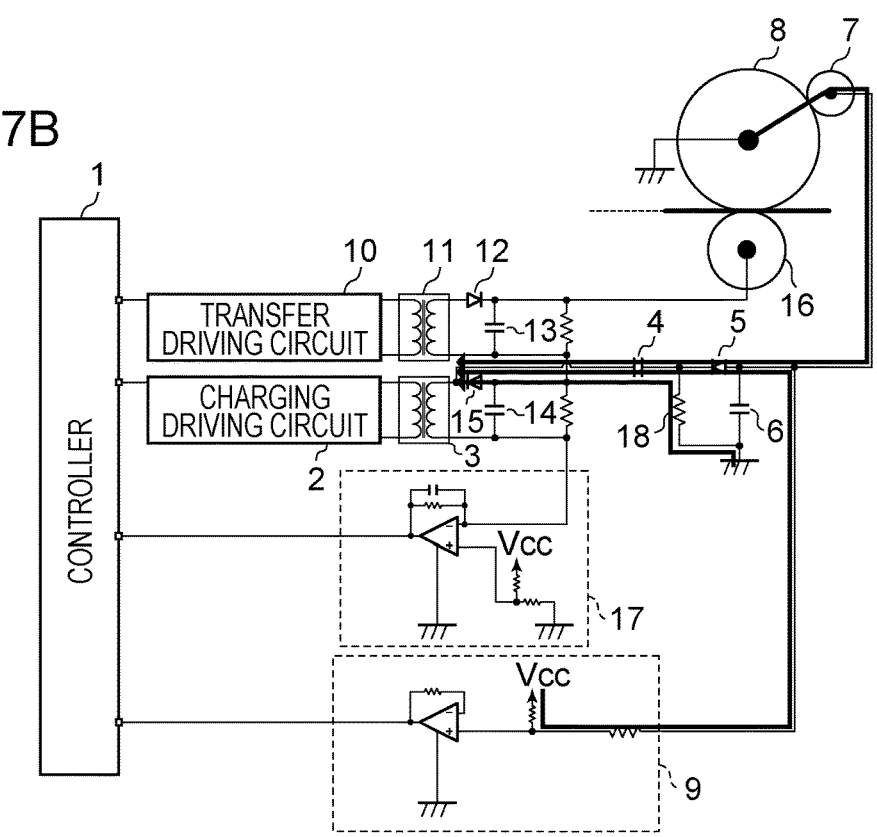

FIGS. 7A and 7B illustrate a path for the flowing current by the capacitor 4 in a case where a potential on a cathode side of the diode 15 becomes positive and a path in a case where the potential becomes negative by the high voltage generated in the secondary coil of the transformer 3.

When the positive voltage is generated on the cathode side of the diode 15, the path for the flowing current by the capacitor 4 becomes as illustrated in FIG. 7A which corresponds to a path flowing from the output terminal of the transformer 3 via the resistor 18 to the ground (reference potential).

On the other hand, when the negative voltage is generated on the cathode side of the diode 15, the path for the flowing current by the capacitor 4 becomes as illustrated in FIG. 7B. A path flowing from the ground via the resistor 18 to the output terminal of the transformer 3, a path flowing from the charging roller 7 to the output terminal of the transformer 3, and a path flowing from the voltage detection circuit 9 to the output terminal of the transformer 3 exist. Therefore, the current flowing into the capacitor 4 when the negative voltage is generated at the output terminal of the transformer 3 is higher than the current flowing into the capacitor 4 when the positive voltage is generated at the output terminal of the transformer 3.

For this reason, the capacitor 4 is to be charged with the voltage in which a side connected to a cathode of the diode 5 is set as positive. Thereafter, when the capacitor 4 is charged with the voltage in which the side connected to the cathode of the diode 5 is positive, the charging bias applied to the charging roller 7 becomes a difference between the negative voltage generated at the output terminal of the transformer 3 and the voltage charged in the capacitor 4. For this reason, the transformer 3 needs to output a higher negative voltage by an amount corresponding to the voltage charged in the capacitor 4. For example, when the capacitor 4 is charged with +117 V and the charging bias of −1310 V is needed, the output of the secondary coil of the transformer 3 needs to be higher than at least a peak voltage of −1427 V, which leads to the increase in the sizes of the transformer 3 and the charging driving circuit 2. In addition, as described above, the transfer bias is a bias obtained by superimposing the positive voltage charged in the capacitor 13 and the negative voltage charged in the capacitor 14 on each other. Therefore, when the negative voltage output by the transformer 3 is increased, the increase in the sizes of the transformer and the driver circuit of the transfer circuit is also invited.

In the power supply apparatus of FIG. 1 which will be described below, in a case where the alternating-current components of the transistor are separated to be thereafter rectified and smoothed, when the charging of the separation unit that separates the alternating-current components is suppressed, it is possible to suppress the magnitude of the output from the secondary coil of the transformer to be low. It is further possible to realize the miniaturization and/or the cost reduction of the power supply apparatus.

Case of the Power Supply Apparatus of FIG. 1

Figure 2A:
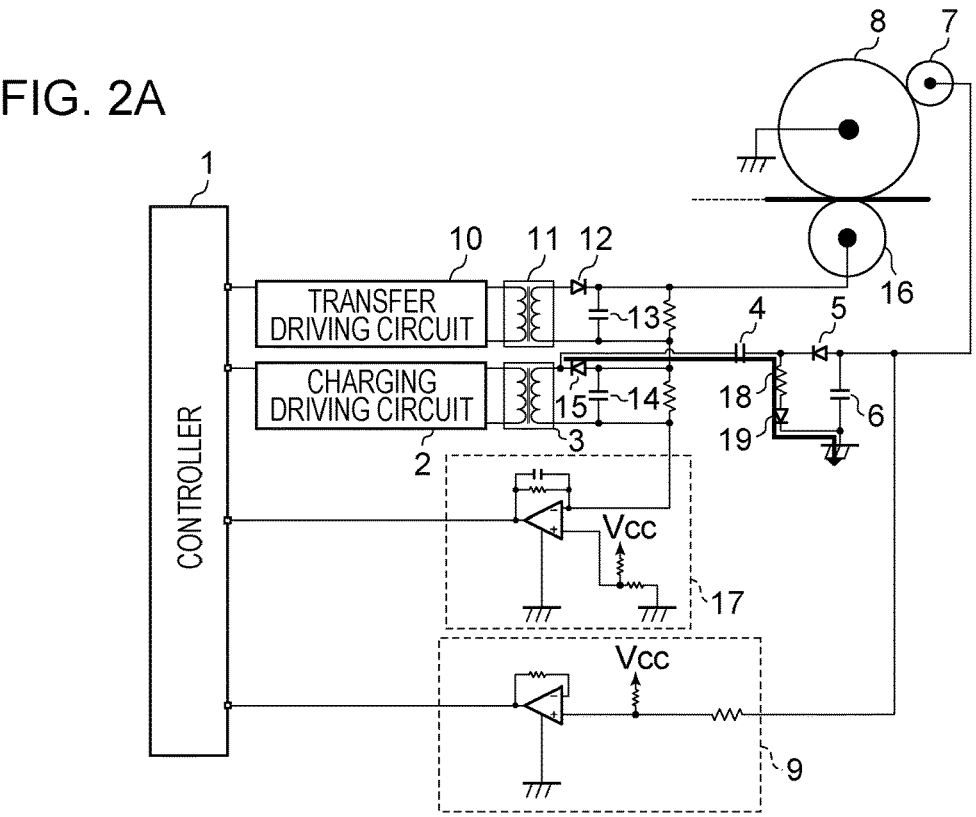
FIGS. 2A and 2B illustrate a current path flowing through a capacitor in the power supply apparatus according to the first exemplary embodiment.
Figure 2B:
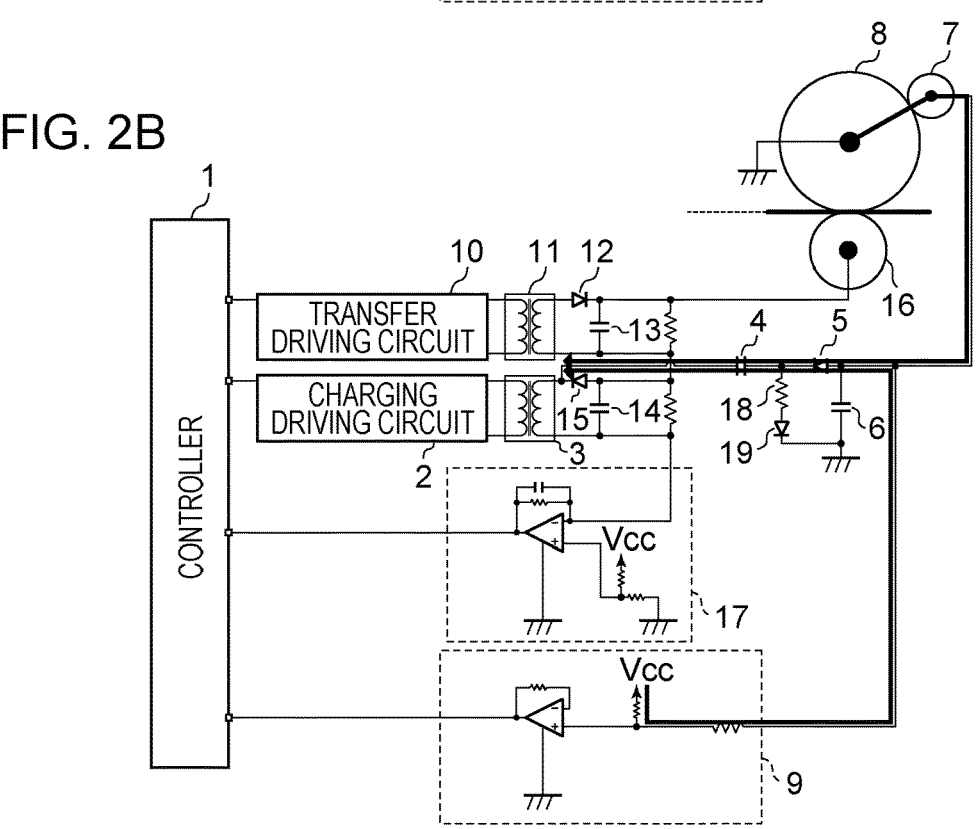

FIGS. 2A and 2B illustrate a path for the current flowing through the capacitor 4 in a case where a potential on the cathode side of the diode 15 becomes positive and a path in a case where the potential becomes negative by the high voltage generated in the secondary coil of the transformer 3. These paths are different from those in the cases of FIGS. 7A and 7B.

First, when the positive voltage is generated on the cathode side of the diode 15, the path for the current flowing through the capacitor 4 becomes as illustrated in FIG. 2A which corresponds to a path through which the current flows from the output terminal of the transformer 3 via the resistor 18 and the diode 19 to the ground.

On the other hand, when the negative voltage is generated on the cathode side of the diode 15, the path for the current flowing through the capacitor 4 as illustrated in FIG. 2B which corresponds to a path from the photosensitive drum 8 and the charging roller 7 to the output terminal of the transformer 3 and a path flowing from the voltage detection circuit 9 to the output terminal of the transformer 3. The diode 19 serving as the rectifier unit interrupts the current flowing from the ground set as the reference to the capacitor 4 serving as the separation unit.

In this manner, in the case of FIGS. 2A and 2B, since the current path via the resistor 18 in FIG. 2B is interrupted by the diode 19 serving as the rectifier unit, it is found that imbalance of the charging of the capacitor 4 in positive and negative directions is further eliminated as compared with the case of FIGS. 7A and 7B described above. It should be noted that, in a case where the charging voltage of the capacitor 4 can be reduced even when this imbalance is not completely eliminated, it is also possible to reduce a necessary output amplitude of the transformer 3, which can contribute to the miniaturization and the cost reduction of the transformer 3.

Setting Method for a Resistance Value

Figure 3:
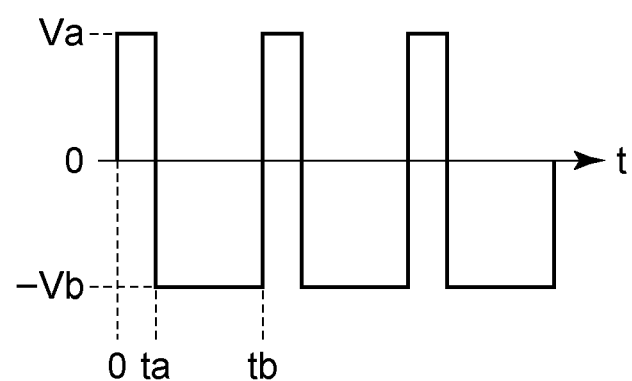
FIG. 3 illustrates a voltage generated in a secondary coil of a transformer according to the first exemplary embodiment.

As described above, when the charging voltage of the capacitor 4 is reduced, the advantage in accordance with the reduction can be attained, but the charging voltage is preferably set to be as close as zero. Hereinafter, a method of determining a resistance value at which the charging to the capacitor 4 is more effectively suppressed will be described. Herein, a case will be described as an example where the high voltage illustrated in FIG. 3 is generated in the secondary coil of the transformer 3.

First, a current Ica flowing into the capacitor 4 during a period (t=0 to ta) in which the positive voltage is generated on the cathode side of the diode 15 can be represented by the following equation.

$$Ica = \frac{v(t) - vc(t) - Vf19}{R} \quad (1)$$

Herein, v(t) denotes a voltage generated on the cathode side of the diode 15, Vc(t) denotes a voltage between both ends of the capacitor 4, Vf19 denotes a forward voltage of the diode 19, and R denotes a resistance value of the resistor 18. Since a current Ica represented by Equation (1) flows during a period of t=0 to ta, charges Qca to be charged in the capacitor 4 during this period are represented by the following equation.

$$Qca = \int_0^{ta} \left( \frac{v(t) - vc(t) - Vf19}{R} \right) dt \quad (2)$$

Next, charges Qcb to be charged in the capacitor 4 during a period (t=ta to tb) in which the negative voltage is generated on the cathode side of the diode 15 can also similarly be represented by the following equation.

$$Qcb = \int_{ta}^{tb} \left( \frac{v(t) + Vcc - vc(t) - Vf5}{Rd} + \frac{v(t) - vc(t) - Vf5}{Rp} \right) dt \quad (3)$$

Herein, Vf5 denotes a forward voltage of the diode 5, Rd denotes an impedance component of the voltage detection circuit 9, and Rp denotes a combined impedance component of the photosensitive drum 8 and the charging roller 7. At this time, since voltages Va and Vb generated in the secondary coil of the transformer 3 are significantly higher than Vcc, Vf19, and Vf5, Equations (2) and (3) can be approximated to Equations (4) and (5) as follows.

$$Qca \cong \int_0^{ta} \frac{v(t) - vc(t)}{R} dt \qquad (4)$$

$$Qcb \cong \int_{ta}^{tb} \left( \frac{v(t) - vc(t)}{Rd} + \frac{v(t) - vc(t)}{Rp} \right) dt \qquad (5)$$

Furthermore, since vc(t)=0 is established under a condition where the capacitor 4 is not charged with the charges, Equations (4) and (5) can be approximated to Equations (6) and (7) as follows. It should be noted that v(t)/R in Equation (6) corresponds to the flowing current by the capacitor 4 when the voltage generated in the secondary coil of the transformer 3 is positive, and ((Rd+Rp)/RdRp)×v(t) in Equation (7) corresponds to the flowing current by the capacitor 4 when the voltage generated in the secondary coil is negative. To distinguish the currents from each other, the currents can also be respectively referred to as a first current and a second current. In addition, the time of 0 to ta corresponds to the time when the capacitor 4 is charged by the first current flowing when the positive voltage is generated in the secondary coil, and the time of ta to tb corresponds to the time when the capacitor 4 is charged by the second current flowing when the negative voltage is generated in the secondary coil. A state in which Equation (6) and Equation (7) become equal to each other means that a magnitude relationship between a first current value and a second current value is opposite to a magnitude relationship between the time of 0 to ta and the time of ta to tb. In a case where the time of 0 to ta and the time of ta to tb are set to be the same, the resistance value of the resistor 18 may be determined in a manner that the relationship between the first current value and the second current value becomes equal to each other.

In addition, a waveform illustrated in FIG. 3 and waveforms illustrated in FIGS. 5A and 5B which will be described below are represented by rectangles, but the voltage generated in the secondary coil of the transformer 3 may be a sign wave in some cases. In this case, when an average current value during a period in which the voltage of the secondary coil is positive is set to be equivalent to the above-described first current value, and an average current value during a period in which the voltage of the secondary coil is negative is set to be equivalent to the above-described second current value, the same also applies to the magnitude relationship between the first current and the second current and the magnitude relationship between the times when the respective currents flow.

$$Qca = \frac{1}{R} \int_0^{ta} v(t)dt \qquad (6)$$

$$Qcb = \left( \frac{1}{Rd} + \frac{1}{Rp} \right) \int_{ta}^{tb} v(t)dt \qquad (7)$$

Herein, since the condition where the capacitor 4 is not charged is Qca=Qcb, from Equations (6) and (7) in the waveform of FIG. 3, the resistance value of the resistor 18 can be represented by the following equation.

$$R = \frac{Rd \times Rp \times Va \times ta}{(Rd + Rp) \times (tb - ta) \times Vb} \qquad (8)$$

When the resistance value R is determined as represented by Equation (8), the total amount of charges moving in the capacitor 4 per one cycle of an alternating-current waveform of FIG. 3, that is, the flowing average current by the capacitor 4 can be logically set as zero, and it is possible to suppress the charging of the capacitor 4.

When the configuration of the present exemplary embodiment is adopted as described above, the charging to the capacitor 4 can be suppressed to be low or adjusted, and it is possible to further suppress the magnitude of the output from the secondary coil of the transformer 3 to be low. In addition, the increase in the sizes of the transformers 3 and 11 and the driver circuit can be suppressed, which can lead to the small-sized low-cost power supply apparatus. It is also possible to obtain an appropriate resistance value at which the charging to the capacitor 4 can be further reduced by the setting method described with reference to Equations (1) to (8).

Second Exemplary Embodiment

According to the configuration of the first exemplary embodiment, in a case where the high voltage generated in the secondary coil of the transformer 3 is constant, the average current (charging) to the capacitor 4 can be set as zero or a value close to zero. However, a density of a formed image fluctuates due to a characteristic change of the image forming apparatus itself, an operational environment change, or the like in actuality, and the charging bias may be changed to correct the fluctuation in some cases. For example, in contrast to the charging voltage of −900 V at an assumed normal state, the charging voltage is changed to −1200 V in a low temperature low humidity environment. On the other hand, the charging voltage is changed to −800 V, for example, in a high temperature high humidity environment. In these cases, since the voltage generated in the secondary coil of the transformer 3 is changed, the imbalance occurs or increases, and an issue may occur that a charging pressure of the capacitor 4 increases.

Figure 4:
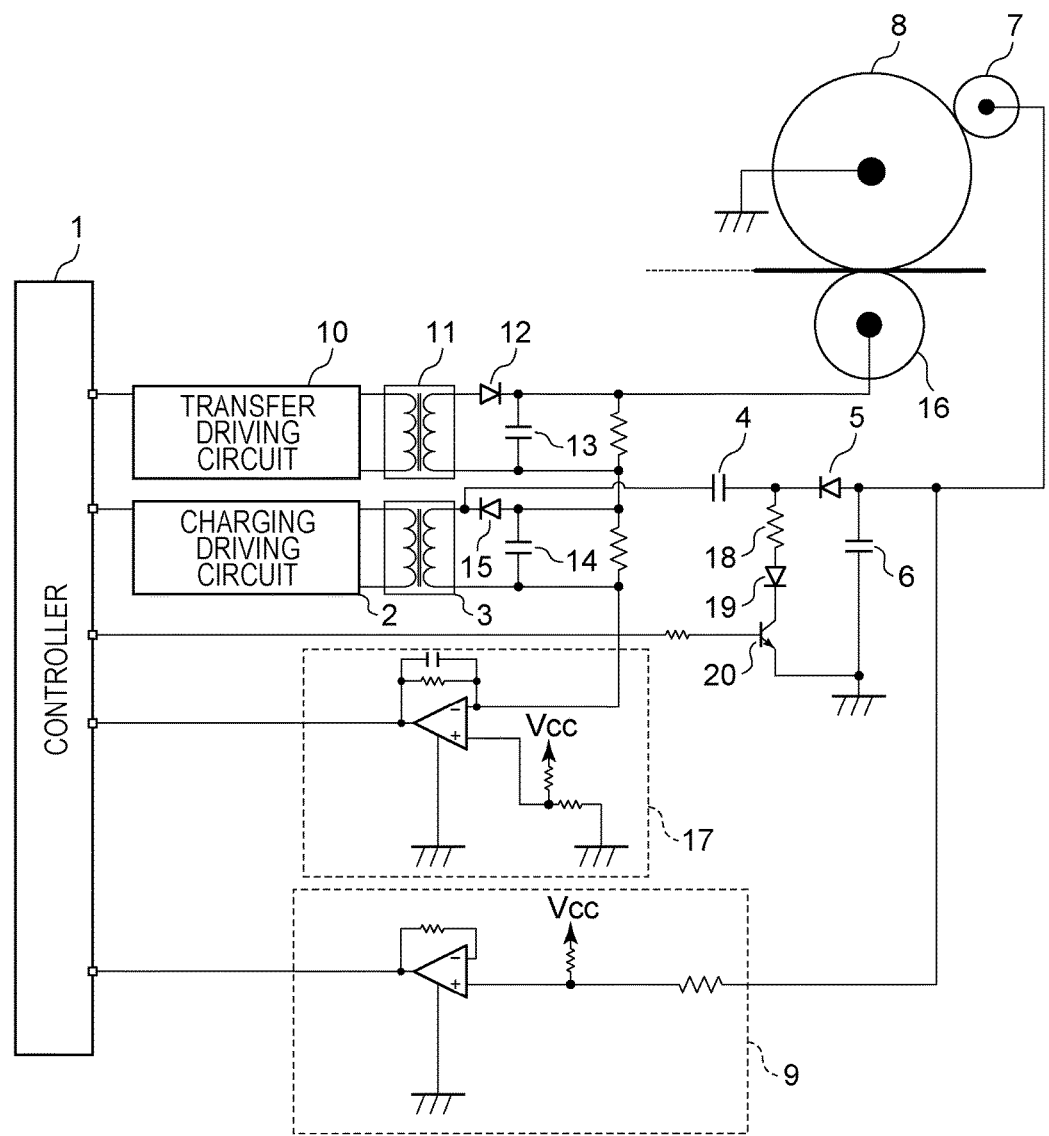
FIG. 4 illustrates a configuration of the power supply apparatus according to a second exemplary embodiment.

FIG. 4 illustrates a schematic diagram of the power supply apparatus according to the second exemplary embodiment. A transistor 20 is further connected to the ground side of the diode 19 of the power supply apparatus according to the first exemplary embodiment. A configuration similar to that of the first exemplary embodiment is assigned with the same reference sign, and descriptions thereof will be also omitted. In addition, the operations in the processes including the charging, the transfer, and the transfer roller cleaning in the electrophotographic process are similar to those of the first exemplary embodiment, and descriptions thereof will be also omitted.

Figure 5A:
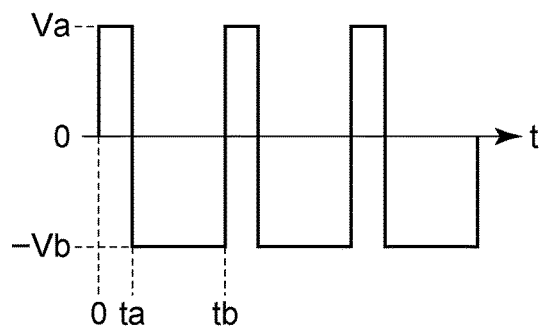
FIGS. 5A and 5B illustrate a voltage generated in the secondary coil of the transformer according to the second exemplary embodiment.
Figure 5B:
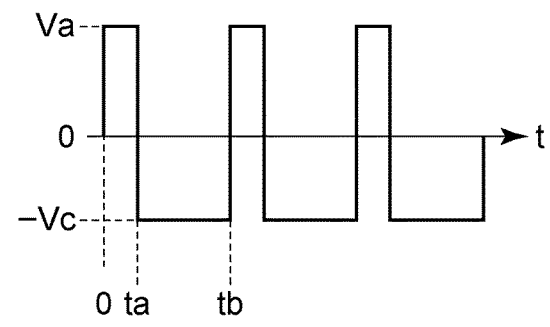

FIGS. 5A and 5B illustrate examples of the waveform generated in the secondary coil of the transformer 3 in a case where the above-described change of the charging voltage occurs. It should be noted that Vb>Vc is established with regard to a peak value of the negative voltage, and the peak of Vc declines in FIGS. 5A and 5B. Vb and Vc mean absolute values. Herein, the charging driving circuit 2 that drives the transformer 3 will be described. A predetermine direct-current voltage (for example, DC 24 V) is added to a side of a primary coil side of the transformer 3. When the charging driving circuit turns on/off the direct-current voltage added to the primary coil by a switch, waveforms of FIGS. 5A and 5B are obtained. At the time of this on/off operation, the voltage Va is determined by a value of the direct-current voltage applied to the primary coil. On the other hand, the negative voltage −Vc changes in accordance with a length of an on time. The value of Vc is increased as the on time is longer, and the value of Vc is decreased as the on time is shorter. The case of FIG. 5B is equivalent to a case where the on time is set to be shorter since the value of Vc is lower as compared with the case of FIG. 5A.

It should be noted that how a value of Vc is determined is previously set depending on the characteristics of the image forming apparatus and the toner, the operational environment of the image forming apparatus, a situation of a use history, or the like, and these setting values are stored in a memory which is not illustrated in the drawing in the controller 1. The controller 1 changes the on time by appropriately determining the situation on the basis of a detected value, a counted value, or the like and reading an appropriate setting value from the memory.

First, when the voltage generated in the secondary coil of the transformer determines the resistance value of the resistor 18 with respect to the waveform of FIG. 5A by the method illustrated according to the first exemplary embodiment, the resistance value R is determined as represented by Equation (8).

However, when the charging bias is changed due to the density fluctuation or the like and the voltage generated in the secondary coil of the transformer is set to have the waveform of FIG. 5B, the configuration of the first exemplary embodiment becomes as follows. That is, the charges which are charged to the capacitor 4 during the period in which the positive voltage is generated on the cathode side of the diode 15 and the period in which the negative voltage is generated are respectively represented by Equations (9) and (10).

$$Qcc = \frac{1}{R}\int_0^{ta} v(t)dt = \frac{(Rd + Rp) \times (tb - ta) \times Vb}{Rd \times Rp} \quad (9)$$

$$Qcd = \left(\frac{1}{Rd} + \frac{1}{Rp}\right)\int_{ta}^{tb} v(t)dt = \frac{(Rd + Rp) \times (tb - ta) \times Vc}{Rd \times Rp} \quad (10)$$

At this time, Qcc>Qcd is established due to Vb>Vc, that is, the charging amount of the capacitor 4 in FIG. 2A is higher than the charging amount of the capacitor 4 in FIG. 2B. Therefore, the capacitor 4 is charged with the charges in a direction in which a side connected to the secondary coil of the transformer is set as positive. In a case where the capacitor 4 is charged in the above-described direction, the cleaning bias may be higher than a potential of the photosensitive drum depending on the charging voltage, and there is a possibility that the cleaning operation for moving the toner having the negative polarity which is adhered onto the transfer roller to the photosensitive drum is not sufficiently performed. For example, in a case where the charging voltage of the capacitor 4 is 150 V and the charging voltage is −900 V, the cleaning bias becomes −750 V (−900 V+150 V). At this time, when the surface of the photosensitive drum 8 is charged at −800 V by the charging bias of −900 V, the toner having the negative polarity is not moved from the transfer roller 16 to the photosensitive drum 8, and the cleaning operation ends up in an insufficient result.

On the other hand, according to the configuration of the present exemplary embodiment, when the on/off timings of the transistor 20 are controlled by the controller 1, the average current to the capacitor 4 can be set as zero even when the voltage generated in the secondary coil of the transformer 3 is changed. Hereinafter, descriptions will be provided of a method of determining the on/off timings of the transistor 20 in a case where the resistance value of the resistor 18 is determined by Equation (8).

First, in a case where the voltage generated in the secondary coil of the transformer 3 has the waveform of FIG. 5A, the controller 1 turns on the transistor 20 at the time of t=0 and turns off the transistor 20 at the time of t=ta. When the transistor 20 is operated in this manner, the power supply apparatus of FIG. 4 performs the operation similar to that of the first exemplary embodiment, and the capacitor 4 is not charged.

On the other hand, in a case where the charging bias is changed due to the density change or the like and the voltage generated in the secondary coil of the transformer 3 is set to have the waveform of FIG. 5B, the controller 1 turns on the transistor 20 at the timing of t=0 and turns off the transistor 20 at a timing represented by the following equation. At this time, charges Qce charged in the capacitor 4 during the period of t=0 to ta is represented by Equation (12). When the transistor 20 is controlled at a timing represented by Equation (11), the controller 1 can reduce the time when the current flows from the capacitor 4 to the ground (reference potential).

$$t = \frac{Vc}{Vb} \quad (11)$$

$$Qce = \frac{1}{R}\int_0^{\frac{Vc}{Vb}ta} v(t)dt \quad (12)$$

On the other hand, since charges Qcf to be charged in the capacitor 4 during the period of t=ta to tb is represented by Equation (10), an equation (13) is established from Equation (12) and Equation (10), and the resistance value of the resistor 18 is obtained by the following Equation (14). In this manner, when the transistor 20 is turned off at the timing represented by Equation (11), the total amount of charges moving in the capacitor 4 can be set as zero per one cycle of the high voltage generated in the secondary coil of the transformer 3. Therefore, it is possible to suppress the charging of the capacitor 4.

$$Qce = \frac{1}{R}\int_0^{\frac{Vc}{Vb}ta} v(t)dt = \frac{(Rd + Rp) \times (tb - ta) \times Vc}{Rd \times Rp} \quad (13)$$

$$R = \frac{Rd \times Rp \times Va \times (Vc/Vb)ta}{(Rd + Rp) \times (tb - ta) \times Vc} \quad (14)$$

Figure 8:
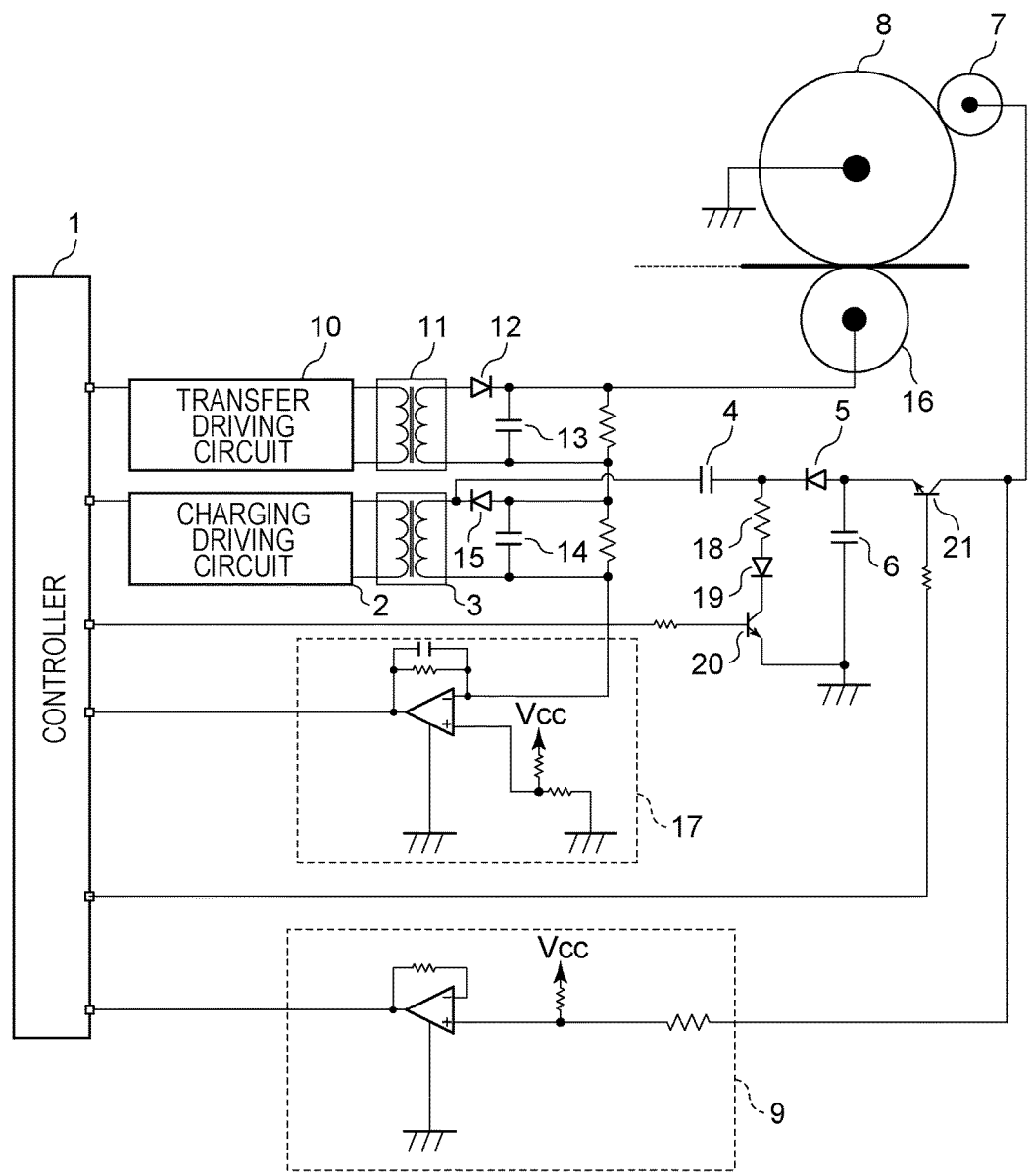
FIG. 8 illustrates a configuration of a power supply apparatus set as another comparison target.

It should be noted that, in a case where Vb<Vc is established, a mode may be also adopted in which an integral time (charging time of the capacitor 4) in Equation (10) is set to be short as in t=ta to (Vb/Vc)×tb, and the integral time during the period in which the positive voltage is generated on the cathode side of the diode 15 is set as t=0 to ta. In this case, a transistor that interrupts the current illustrated in FIG. 2B may be arranged on an anode side of the diode 5 to be controlled by the controller 1. FIG. 8 illustrates an example of the power supply configuration at this time. A transistor 21 is added.

However, in a case where the controller 1 performs the on/off control of the transistor 21 as described above, when the transistor is turned off, the supply of the charging voltage is stopped, or the voltage is not detected by the voltage detection circuit 9. This configuration is not preferably adopted in which the supply of the charging voltage is specified in view of the image quality unless an auxiliary capacitor or the like that turns off the charging voltage is separately arranged, for example.

In contrast to this, when the above-described timing to is set in accordance with the maximum value of Vc that may be set in the apparatus, the period in which the positive voltage is generated on the cathode side of the diode 15 is changed in accordance with a change (decrease) in the peak Vc, and an integrated value represented by Equation (12) can be controlled. That is, it can be mentioned that the controller 1 preferably performs the switching control of the transistor 20 in a manner that the current is caused to flow from the resistor 18 to the ground (reference) for a time in accordance with the peak value of the negative voltage generated on the secondary coil of the transformer 3 after the reduction.

When the configuration of the present exemplary embodiment is adopted as described above, even in a case where the charging bias is changed due to the density adjustment or the like, it is possible to suppress the charging to the capacitor 4, and the small-sized low-cost high voltage power supply can be realized.

Third Exemplary Embodiment

According to the above-described respective exemplary embodiments, a case including the current from the voltage detection circuit 9 has been described as the path for the current flowing through the capacitor 4 when the negative voltage is generated on the cathode side of the diode 15, but the configuration is not limited to this. For example, in a case where the configuration of the voltage detection circuit 9 is omitted too, it is possible to determine the appropriate resistance value of the resistor 18 similarly as in the first and second exemplary embodiments.

Specifically, when a term including Rd is deleted from Equation (7) according to the first exemplary embodiment, Equation (8A) is obtained, and a resistance having the resistance value obtained from this can be applied to the resistor 18 of FIG. 1.

$$R = \frac{Rp \times Va \times ta}{(tb - ta) \times Vb} \quad (8A)$$

In the case of the second exemplary embodiment, when an equation obtained by deleting the term including Rd from the right side of Equation (10) is replaced with the right side of Equation (13), Equation (14A) is obtained. A resistance having the resistance value obtained from this can be applied to the resistor 18 of FIG. 4.

$$R = \frac{Rp \times Va \times (Vc/Vb)ta}{(tb - ta) \times Vc} \quad (14A)$$

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-154665 filed Aug. 9, 2017, which is hereby incorporated by reference herein in its entirety.

What is claimed is:

1. A power supply apparatus comprising:
   a one transformer having a primary coil and a secondary coil;
   a first rectifier smoothing unit configured to rectify and smooth an alternating-current voltage generated in the secondary coil of the transformer and output a first voltage;
   a separation unit configured to receive the alternating-current voltage generated in the secondary coil of the transformer as an input and generate an alternating-current voltage, from which alternating-current components are separated, as an output;
   a second rectifier smoothing unit configured to rectify and smooth the output of the separation unit and output a second voltage having a polarity opposite to a polarity of the first voltage;
   a resistor connected to a line branched from a line that connects the separation unit to the second rectifier smoothing unit; and
   a rectifier unit connected in series between the resistor and a reference potential.

2. The power supply apparatus according to claim 1, wherein the rectifier unit causes a current to flow in a direction from the separation unit towards the reference potential and interrupts a current flowing from the reference potential towards the separation unit.

3. The power supply apparatus according to claim 1, wherein a resistance value of the resistor is a resistance value at which a magnitude relationship between a first current value of a first current flowing by the separation unit when the voltage generated in the secondary coil is positive and a second current value of a second current flowing by the separation unit when the voltage generated in the secondary coil is negative becomes opposite to a magnitude relationship between a time when the first current flows and a time when the second current flows.

4. The power supply apparatus according to claim 1, wherein the rectifier unit includes a transistor,
   the power supply apparatus further comprising a control unit configured to perform switching control of the transistor in a manner that a current flows in the resistor for a time in accordance with a peak of the second voltage generated in the secondary coil.

5. The power supply apparatus according to claim 4, wherein the control unit performs the switching control of the transistor in a manner that, in a case where the peak of the negative voltage of the secondary coil declines, the time when the current flows is shortened as compared with the time before the peak declines.

6. The power supply apparatus according to claim 1, wherein the rectifier unit is a diode or a transistor.

7. The power supply apparatus according to claim 1, wherein the separation unit is a capacitor.

8. An image forming apparatus comprising:
   an image bearing body having a surface on which a toner image is formed;
   first and second process members acting on the image bearing body; and
   a power supply apparatus configured to output a voltage to the first and second process members,
   the power supply apparatus including
   a one transformer having a primary coil and a secondary coil, and
   a first rectifier smoothing unit configured to rectify and smooth an alternating-current voltage generated in the secondary coil of the transformer, a first voltage output from the first rectifier smoothing unit being supplied to the first process member, a separation unit configured to receive the alternating-current voltage generated in the secondary coil of the transformer as an input and generate an alternating-current voltage, from which alternating-current components are separated, as an output, a second rectifier smoothing unit configured to rectify and smooth the output of the separation unit, a second voltage having a polarity opposite to a polarity of the first voltage and output from the second rectifier smoothing unit being supplied to the second process member, a resistor connected to a line branched from a line that connects the separation unit to the second rectifier smoothing unit, and a rectifier unit connected in series between the resistor and a reference potential.

9. The image forming apparatus according to claim 8,
wherein the first process member includes a transfer member configured to transfer an image formed on the image bearing body to a recording material, and
wherein the second process member includes a charging member configured to charge the image bearing body.

10. The image forming apparatus according to claim 8, wherein the rectifier unit causes a current to flow in a direction from the separation unit towards the reference potential and interrupts a current from the reference potential towards the separation unit.

11. The image forming apparatus according to claim 8, wherein a resistance value of the resistor is a resistance value at which a magnitude relationship between a first current value of a first current flowing by the separation unit when the voltage generated in the secondary coil is positive and a second current value of a second current flowing by the separation unit when the voltage generated in the secondary coil is negative becomes opposite to a magnitude relationship between a time when the first current flows and a time when the second current flows.

12. The image forming apparatus according to claim 8,
wherein the rectifier unit includes a transistor,
the image forming apparatus further comprising a control unit configured to perform switching control of the transistor in a manner that the current flows for a time in accordance with a peak of a negative voltage generated in the secondary coil.

13. The image forming apparatus according to claim 12, wherein the control unit performs the switching control of the transistor in a manner that, in a case where the peak of the negative voltage of the secondary coil declines, the time when the current flows is shortened as compared with the time before the peak declines.

14. The image forming apparatus according to claim 8, wherein the rectifier unit is a diode or a transistor.

15. The image forming apparatus according to claim 8, wherein the separation unit is a capacitor.

16. The power supply apparatus according to claim 1, wherein the first voltage is a positive voltage and the second voltage is a negative voltage.

17. The power supply apparatus according to claim 1, wherein the second rectifier smoothing unit prevents a current from flowing in the resistor in a case where the second rectifier smoothing unit is outputting the second voltage.

* * * * *